US005376932A

United States Patent [19]

Samokine et al.

[11] Patent Number: 5,376,932

[45] Date of Patent: Dec. 27, 1994

[54] SYSTEM FOR EXCHANGING INFORMATION BETWEEN A PORTABLE OBJECT SUCH AS A KEY AND AN EXCHANGE DEVICE

[76] Inventors: Georges Samokine, 21 boulevard Voltaire, 75011 Paris; Gérard Michot, "La Mare au Buis", 78720 Dampierre; Philippe Namias, Bâtiment B2 Résidence Les Millepertuis, 91940 Les Ulis, all of France

[21] Appl. No.: 396,898

[22] Filed: Aug. 22, 1989

[30] Foreign Application Priority Data

Aug. 24, 1988 [FR] France ................................ 8811165

[51] Int. Cl.5 .......................... H04Q 1/48; G06K 5/00

[52] U.S. Cl. .......................... 340/825.54; 340/825.31; 340/825.34; 235/435

[58] Field of Search ...................... 340/825.31, 825.34, 340/825.54, 825.57, 825.63, 825.64, 572; 361/171, 172; 70/271; 235/441, 449, 435

[56] References Cited

U.S. PATENT DOCUMENTS

| | | | |
|---|---|---|---|
| 3,440,633 | 4/1969 | Vinding | 340/825.54 |
| 3,696,383 | 10/1972 | Oishi et al. | 340/825.54 |
| 4,602,253 | 7/1986 | Kreft | 361/172 |
| 4,724,427 | 2/1988 | Carroll | 340/825.54 |
| 4,818,855 | 4/1989 | Mongeon et al. | 340/825.54 |
| 4,857,893 | 8/1989 | Carroll | 340/825.54 |
| 4,864,292 | 9/1989 | Nieuwkoup | 340/825.54 |
| 4,893,118 | 1/1990 | Lewiner et al. | 340/825.34 |

FOREIGN PATENT DOCUMENTS

| | | | |
|---|---|---|---|
| 0223715 | of 1986 | European Pat. Off. . | |
| 0242906 | 11/1991 | European Pat. Off. . | |
| 2180349 | of 1973 | France . | |
| 2542792 | of 1983 | France . | |
| 2598006 | of 1986 | France . | |
| 2802472 | of 1978 | Germany . | |
| 3507871 | of 1985 | Germany . | |
| 2167586A | of 1984 | United Kingdom . | |
| US87/00374 | of 1987 | WIPO . | |

*Primary Examiner*—Donald J. Yusko
*Assistant Examiner*—J. Giust

[57] ABSTRACT

A system is provided for exchanging information between a portable object, such as a key, and an exchange device, the latter being installed in a lock and transmitting a modulated carrier. The key comprises circuits for demodulating the modulated carrier received and restoring a first signal representative of the information transmitted by the exchange device, as well as processing circuits receiving the first signal and generating a second signal representative of the information to be transmitted. The second signal causes an impedance to vary suddenly so that the load seen by the exchange device varies and The information is thus transmitted thereto. The impedance is adapted in addition as a limiter. A clock signal is obtained, from the modulated carrier, by clipping, as well as a supply voltage by rectification and regulation.

9 Claims, 4 Drawing Sheets

FIG. 5
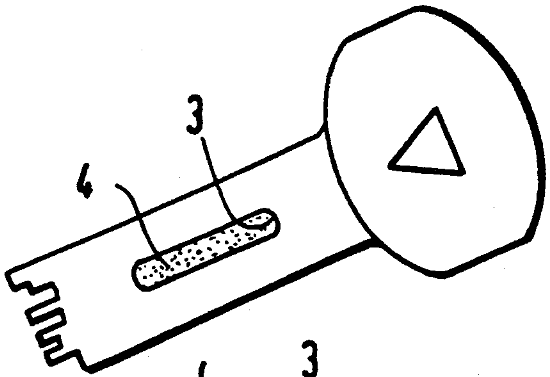
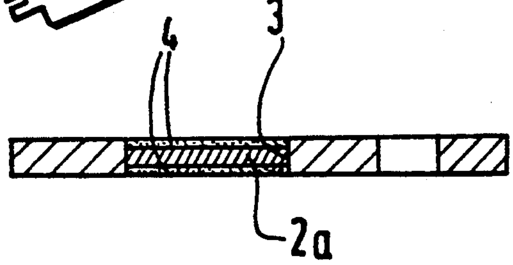
FIG. 5a
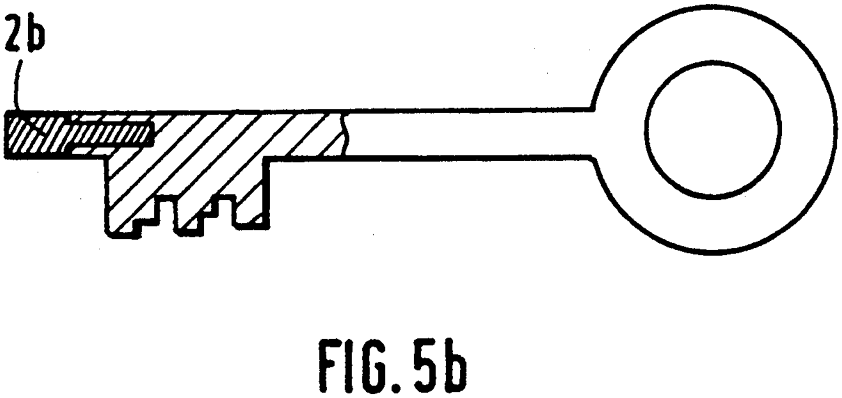
FIG. 5b

SYSTEM FOR EXCHANGING INFORMATION BETWEEN A PORTABLE OBJECT SUCH AS A KEY AND AN EXCHANGE DEVICE

BACKGROUND OF THE INVENTION

1. Field of the Invention

The present invention relates first of all to a system for exchanging information between at least one portable object and at least one sedentary exchange device.

Such a system applies particularly in the locksmithing field. In this case, the portable object is a key provided with electronic circuits capable of receiving, storing and transmitting information in the form of electric signals, and the exchange device is disposed on a lock. The exchange device is adapted for reading, at the moment when the key is introduced into the lock, a secret identification number stored in this key, and for preventing unlocking of the lock if this identification number is not correct. Such a system may be installed on a lock and a key of conventional type, i.e. comprising already a purely mechanical device for identifying the key, so as to reinforce the safety offered by this device. On the other hand, such a system may also be installed on a lock and a key not comprising any mechanical identification means, if the safety thus obtained is considered sufficient.

2. Description of the Prior Art

Systems of the above defined type are already known described for example in German applications DE-A 35 07 871 and DE-A-28 02 472 or in the European application EP-A-0 223 715. In all these systems, the information exchanges between the key and the exchange device take place through a plurality of conductors. This requires, on the lock, a connector provided with a plurality of contacts to be accurately positioned with respect to the contacts of the key, which sometimes raises problems, particularly because of the small size of the key. Furthermore, this makes it impossible in practice to construct a system in which the key and the exchange device are coupled, without electric contacts, by replacing each of the conductors by a pair of two antenna, to the extent that it is very difficult to readily house in a key a plurality of antennae, while taking care that in addition none of them picks up, as a whole or partially, a signal intended for the others. Now, a system without electric contacts has, in some cases, advantages, such as insensitivity to stains, or the possibility of mechanically protecting the key by a plastic material molding.

A system is also known from the French patent FR 2 180 349 in which the information exchanges between the key and the lock take place through two conductors only, one for setting a common reference potential and the other for transmitting potential variations in one direction or in the other. However, this result is obtained at the price of a relative complexity of the signals and processing circuits, which complexity results in the fact that, if attempts are made to omit these conductors, it is necessary to provide two pairs of antennae, one for the passage of signals from the exchange device to the portable object and the other for the passage of signals from the portable object to the exchange device.

SUMMARY OF THE INVENTION

The present invention aims at overcoming the above drawbacks by providing a system for the exchange of information between a portable object and an exchange device, which is of a simple and reliable design, in which the information exchanges take place either through two contacts, or through a single pair of antennae.

For this, it provides a system of the above defined type, characterized by the fact that said exchange device comprises:

- first processing means generating a first signal; representative of a first succession of binary elements or bits to be transmitted to said portable object,
- means for modulating a carrier wave in response to said first signal,
- means for transmitting the modulated carrier, and
- first detector means for detecting sudden variations of amplitude of the current in said transmission means and delivering a detected signal to said first processing means, and said portable object comprises:

- means for restoring said first signal in response to the modulated carrier received,
- second processing means receiving said first restored signal and generating a second signal representative of a second succession of bits to be transmitted to said exchange device, and
- means for suddenly varying the load, which said portable object represents for said transmission means, in response to said second signal, so that, during the transmission time of a bit of the first succession, a bit of the second succession is transmitted and detected by said first detector means.

In the system of the invention, the information from the exchange device and intended for the portable object is transmitted, in a way known per se, by modulating a carrier wave. To transmit this modulated carrier, a set of two conductors or a pair of antennae can be used indifferently. However, because the information from the portable object and intended for the exchange device is transmitted by varying the load seen by the latter, it results in variations of amplitude of the modulated carrier, whether the connection between the exchange device and the portable object is formed by two conductors or by a pair of antennae. In both cases, these variations are detected by the exchange device. Thus, the problem of the connection between the key and the lock may be resolved simply, either by using two contactors or by using a pair of antennae, which appreciably simplifies the problems of relative positioning of the contacts or of the antennae, for example. Furthermore, the transmission of the bits to the key and the transmission to the lock may take place simultaneously, which reduces the overall exchange times.

In the preferred embodiment, said modulation means are adapted for modulating the amplitude of said carrier and said restoration means comprise second detector means for detecting the sudden variations of amplitude of the modulated carrier received and said sudden variation means are adapted for limiting the amplitude of the modulated carrier received.

Then the system is practically insensitive to the inevitable fluctuations of the level of the modulated carrier received, related for example to the quality or to the cleanness of the contacts in the case of a connection by contacts, or to the geometry or relative positioning of the antennae in the case of a contactless connection.

The system is therefore reliable and sure in use. In addition, said portable object comprises both means for clipping said modulated carrier, said second processing means being synchronized by said clipped signal, and means for rectifying the modulated carrier received, as well as regulation means for delivering, in response to the rectified carrier, an electric energy supply voltage to all the electronic components of the portable object.

Then, it is not necessary to provide, on the portable object, an oscillator delivering a clock signal synchronous with the clock signal of the exchange device. Similarly, it is not necessary to provide a battery for supplying the portable object with electric energy.

Advantageously, said transmission means comprise a first coil and said restoration means a second coil and the coupling between said portable object and said exchange device is magnetic coupling, obtained by drawing together said first and second coils without contact.

The present invention also provides a portable object for exchanging information with at least one sedentary exchange device transmitting a modulated carrier, characterized by the fact that it comprises:

- means for receiving an demodulating said modulated carrier,
- processing means receiving the demodulated signal and generating a signal representative of a succession of bits to be transmitted to said exchange device, and
- means for suddenly varying the load, which said portable object represents for said exchange device, in response to said signal.

BRIEF DESCRIPTION OF THE DRAWINGS

The present invention will be better understood from the following description of the preferred embodiment of the system of the invention, with reference to the accompanying drawings in which:

FIGS. 5*a* and 5*b* show examples of implanting the electronic circuits of FIG. 2 on a flat key and on a cylindrical key.

DESCRIPTION OF THE PREFERRED EMBODIMENT

A system for exchanging information between a portable object, in this case a key, and an exchange device installed in a lock, and so sedentary, which makes it possible, for example, prior to allowing unlocking of the lock, to check an identification number stored in the key, will now be described.

Figure 1:
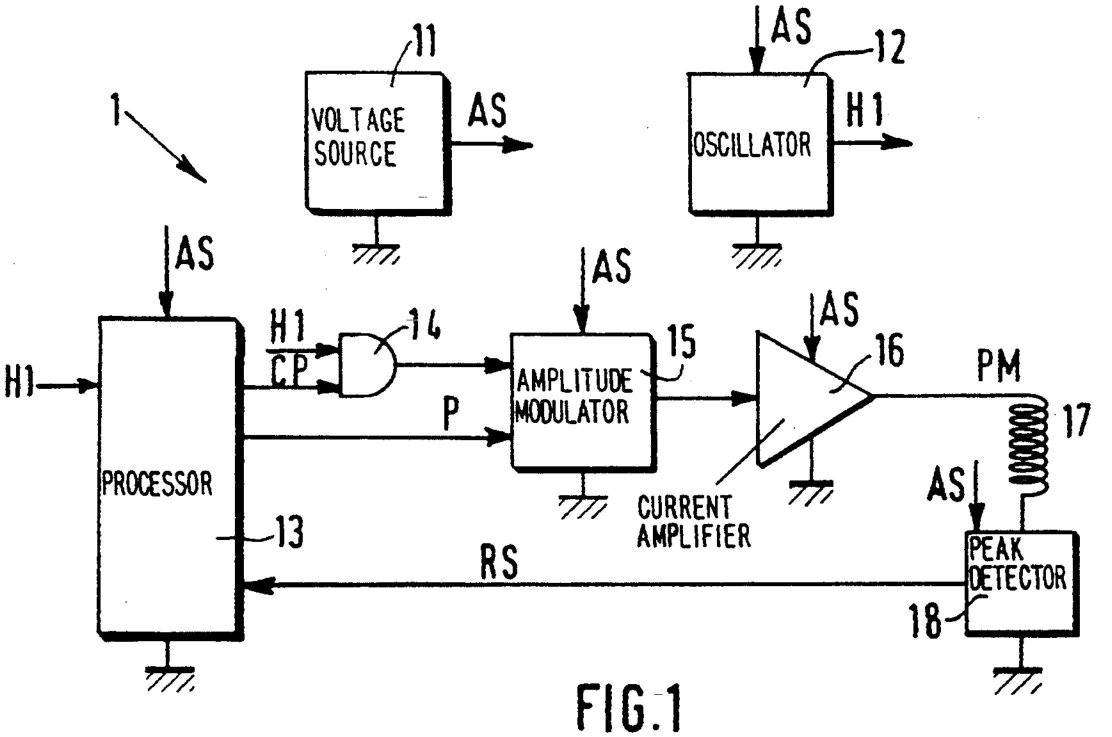
FIG. 1 is a block diagram of the electronic circuits of an exchange device disposed in a lock.

Referring to FIG. 1, the exchange device comprises first of all an electric energy supply circuit 11 which generates the supply voltage(s) AS required for the different components of the exchange device.

An oscillator 12 delivers a carrier wave H1, of a frequency here equal to 100 kHz.

A processing circuit 13, with microprocessor, is provided with a synchronization input receiving the carrier H1, an output delivering a binary signal CP controlling the carrier, an output delivering a binary signal P representative of a first succession of binary elements or bits to be transmitted to the key and an input receiving a binary signal RS. An AND gate 14 is provided with two inputs receiving the signal CP and the carrier H1 respectively and an output connected to the carrier input of a modulator circuit 15, here an amplitude modulator.

The modulator circuit 15 is also provided with a modulation input receiving the signal P and an output connected to the input of a current amplifier 16, loaded by a coil 17 in series with a circuit 18 detecting the sudden variations of the current which flows therethrough.

Circuit 18 is adapted for detecting the peak value of the current flowing therethrough and comparing it permanently with the instantaneous value of this amplitude. It delivers here an output signal RS at level 1 when the instantaneous value becomes greater than the peak value detected, which results in a sudden increase of the current which the peak detector does not immediately take into account. Conversely, the output signal RS passes to level 0 when the current decreases suddenly. It should be noted that such a device detects a sudden variation independently of the staring point of this variation, which is useful in the application described, as will be better understood further on.

Figure 2:
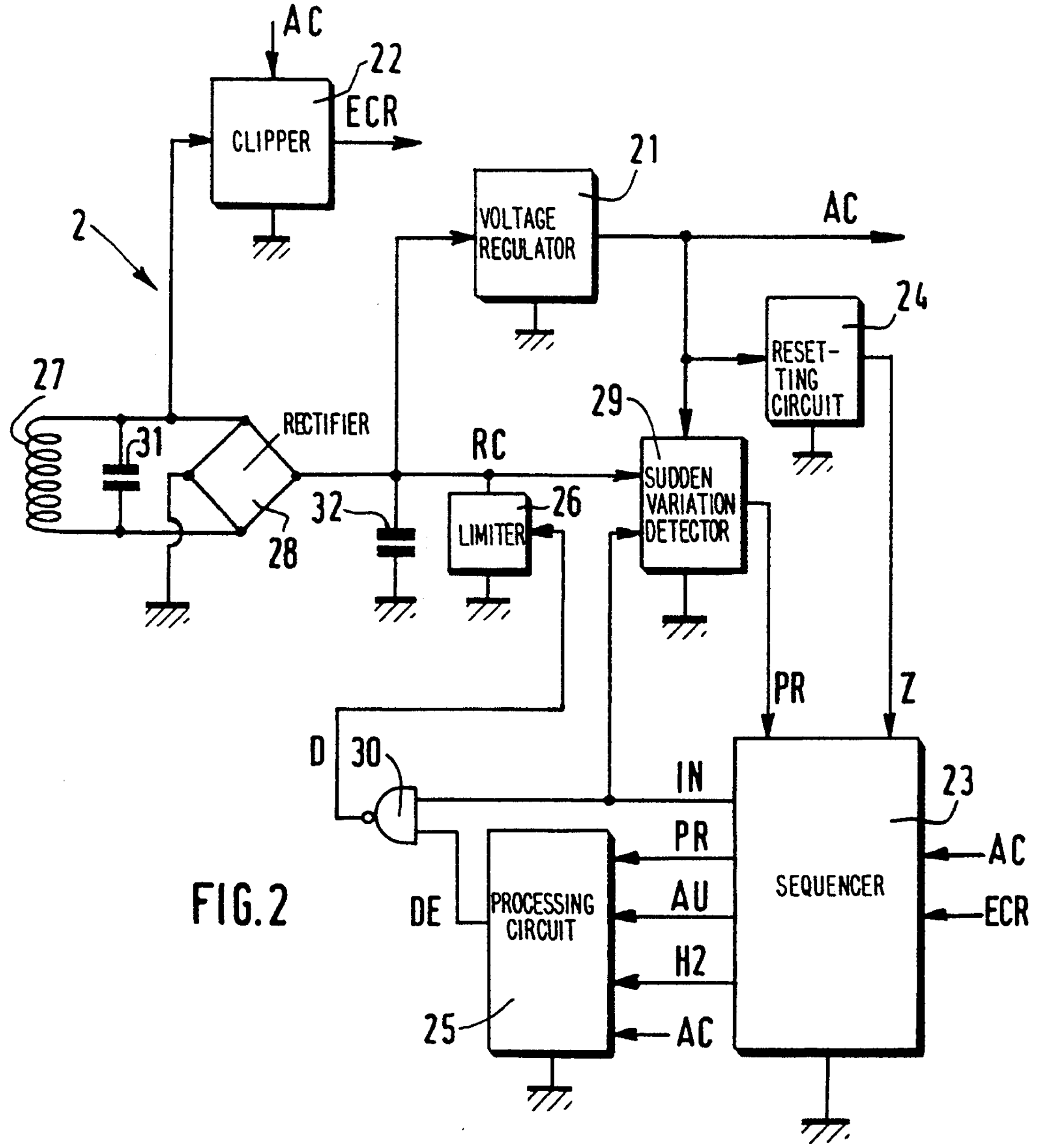
FIG. 2 is a block diagram of the electronic circuits of a key for exchanging information with the exchange device of FIG. 1.

Referring now to FIG. 2, the portable object, namely here the key 2, will now be described.

The key comprises first of all a coil 27, intended to be coupled to coil 17, when the key 2 is introduced in the lock, coil 17 forming the only access which connects the assembly of electronic circuits which will now be described with the outside.

A capacitor 31 is connected in parallel across coil 27.

A full-wave rectifier circuit 28 is provided with an input access, receiving the voltage at the terminals of coil 27, and an output access, one terminal of which is grounded and the other delivers a rectified signal RC.

A capacitor 32 is disposed in parallel across the output of the rectifier circuit 28.

A voltage regulator circuit 21 is provided with an input receiving the rectified signal RC and an output delivering a supply voltage AC, equal here substantially to +5 V. This voltage makes it possible to supply with electric energy all the components of the key which require it. A clipping circuit 22, fed by the voltage AC, is provided with an input one terminal of which is connected to ground and he other of which is connected to one of the ends of coil 27. The clipping circuit 22 delivers a clipped binary signal ECR. A resetting circuit 24 is provided with an input receiving the supply voltage AC and an output delivering a binary signal Z.

A circuit 29 detecting sudden variations, supplied by the voltage AC, is provided with an input receiving the rectified signal RC and an output delivering a binary signal PR. The circuit 29 detects the sudden variations of signal RC. It operates on the same principle as the detector circuit 18 but it comprises, in addition, an inhibition input receiving a binary signal IN. When the signal IN is at level 0, circuit 29 passes to level 0 for a sudden increase of signal RC and to level 1 for a sudden decrease of this signal. When the signal In is at level 1, circuit 29 is inhibited and detects nothing.

A circuit 26 for load variation and limitation of the voltage at its terminals, described further on in greater detail, is disposed in parallel across capacitor 32. It is provided with a control input receiving a binary signal D.

A sequencer circuit 23, fed by voltage AC, is provided with three inputs receiving the binary signals ECR, Z and PR, respectively, and four outputs delivering the binary signal IN, the binary signal PR and the two signals AU and H2 respectively.

A processing circuit 25, fed by the voltage AC, receives the binary signals PR, AU and H2 and delivers the binary signal DE.

An AND gate 30 is provided with two inputs receiving the binary signals In and DE, and an output delivering the binary signal D.

Figure 3:
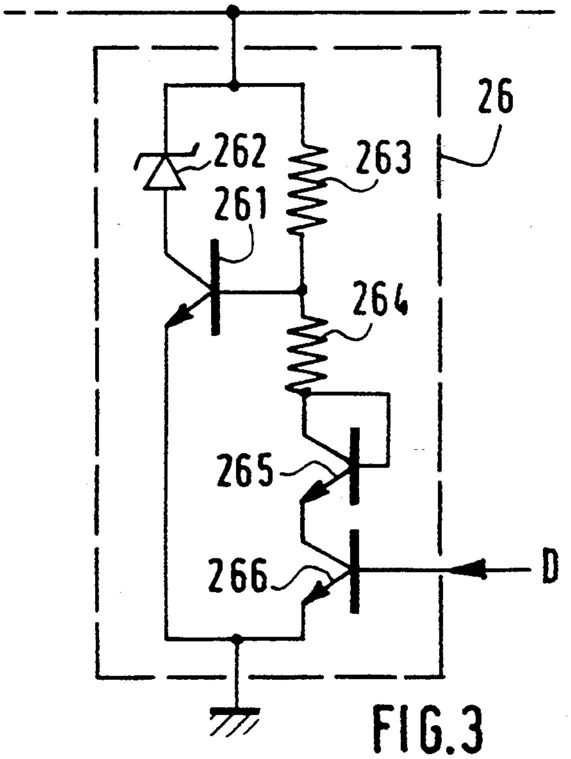
FIG. 3 shows in greater detail the limitation and load variation circuit provided in the key of FIG. 2.

Referring to FIG. 3, the circuit 26 for load variation and limitation of the voltage at its terminals here comprises a bipolar transistor of NPN type 261, whose emitter is connected to ground. A Zener diode 262 is disposed between the contactor of transistor 261 and a conductor which deliver the rectified signal RC. The cathode of the Zener diode is connected to this conductor. The Zener voltage of diode 262 is here 6.2 volts.

A resistor 263 is disposed between the cathode of diode 262 and the base of transistor 261. A resistor 264 is disposed between the base of transistor 261 and the collector and the base, joined together, of a bipolar transistor 265 of type NPN. The emitter of transistor 265 is connected to the collector of a bipolar transistor 266 of type NPN, whose base receives the signal D and whose emitter is connected to ground.

The system which has just been described operates as follows, with reference now to FIG. 4.

In this figure, four successive time intervals or clock periods have been shown, by way of example, each time interval being considered as the transmission time of a bit from the exchange device 1 of the lock to key 2 and, possibly, and as will be better understood hereafter, of a bit from key 2 to the exchange device 1.

Figure 4:
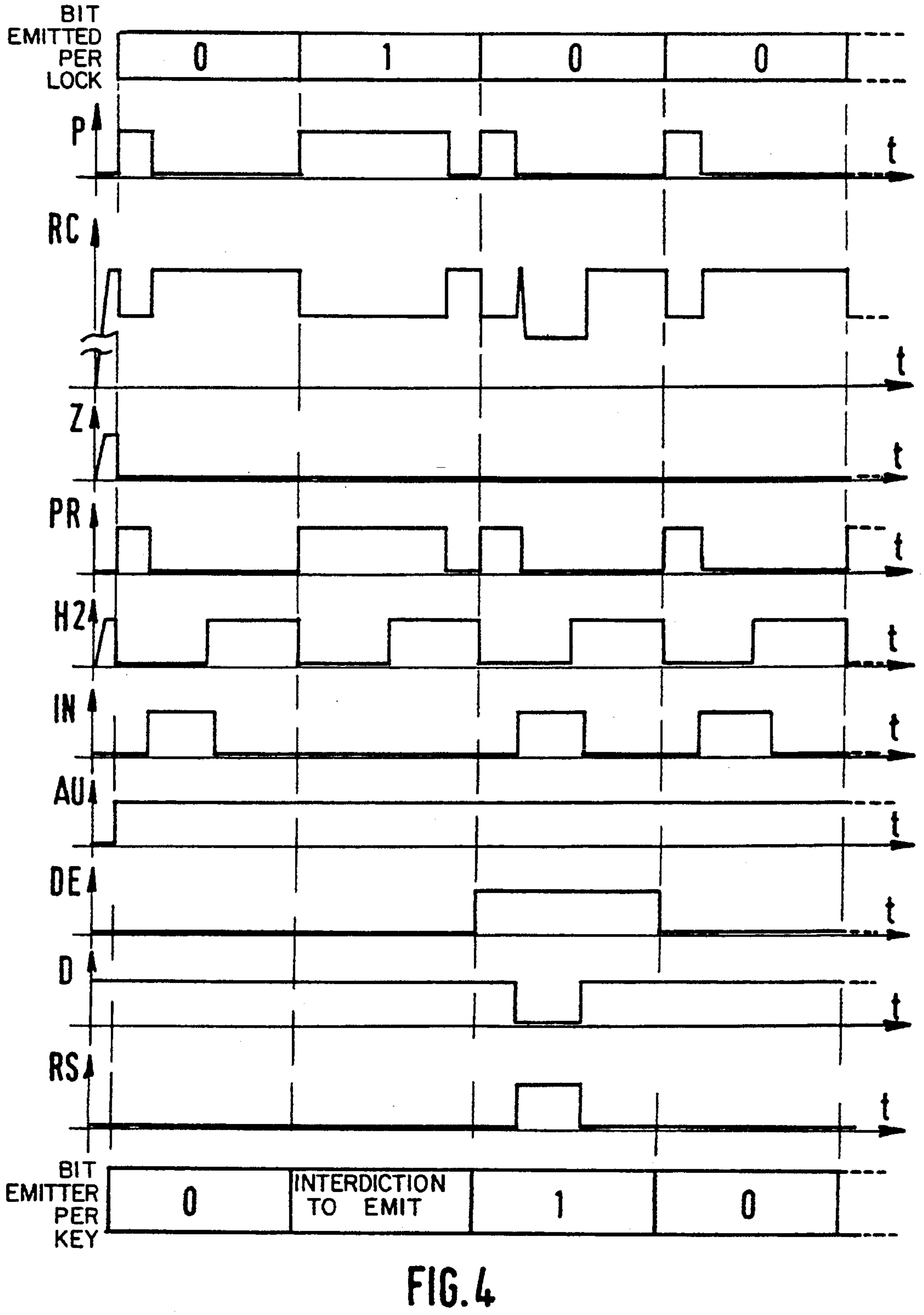
FIG. 4 is a timing diagram of the main signals at different points of the electronic circuits of FIGS. 1 and 2.

The value of the bits of the succession to be transmitted to key 2 is shown in the upper part of FIG. 4, which here shows that the first bit to be transmitted is equal to 0, the second 1, the third 0 and the fourth 0, for example.

The processing circuit 13 is adapted for determining the duration of each clock period, of value T2, so that it is a multiple of the period T1 of carrier H1. Here, the period T2 is equal to:

$$T2 = 64\ T1$$

In response to a signal detecting the introduction of key 2 in the lock, obtained by means of a device not shown because known, the processing circuit 13 causes the carrier control signal CP to pass to the high level and the carrier H1 is effectively applied to the carrier input of the modulator circuit 15.

Simultaneously, the processing circuit 13 generates signal P. As is clear from FIG. 4, signal P is a binary signal which, at the beginning of each clock period, is at the high level and at the end of each clock period at the low level. The duration, or width, of each of the pulses of the succession of pulses thus formed is modulated, i.e. it may take on one of the values of a pair associated with the two possible values 0 and 1 for each bit to be transmitted to key 2. Thus, if a bit to be transmitted to key 2 is equal to 0, the width of the corresponding pulse of signal P is equal to 12 periods T1, and if this bit is equal to 1, the width of the pulse is equal to 52 periods T1. Naturally, these values are only given by way of example, and the low value width, representative of the binary value 0, may be between about 8 and about 16 times the period T1, whereas the high value width, representative of the binary value 1, may be between 48 and about 56 times the period T1.

The binary signal P, representative of the succession of bits to be transmitted to key 2, is therefore applied to the modulator circuit 15. The latter is adapted so that the amplitude of the modulated carrier is here about 10 volts peak to peak when the signal P is at low level and about 8 volts peak to peak when the signal P is at the high level.

The modulated carrier, after current amplification in the current amplifier 16, is applied to coil 17.

It is received by coil 27 of key 2, coupled to coil 17 by magnetic coupling when key 2 is in the lock, which coupling is due to the contactless drawing together of the two coils 17 and 27.

On reception, the modulated carrier is clipped in circuit 22, which generates the signal ECR of period T1 and which, as will be better understood hereafter, will be used as synchronization signal by the sequencer circuit 23.

The modulated carrier received is also rectified in the rectifier circuit 28 which delivers the rectified signal RC shown in FIG. 4. In this figure, in which correct coupling is assumed between coils 17 and 27, the signal RC, after an establishment phase corresponding to the introduction of key 2 in the lock, is substantially equal to 8 volts at the beginning of each clock period and substantially 10 volts at the end of each period, the duration of the 8 volt level being that of the pulse of the corresponding clock period of signal P.

Signal RC is applied to the voltage regulator circuit 21 which generates the supply voltage AC of +5 V.

Resetting circuit 24, in response to establishment of voltage AC, generates a pulse Z for resetting the sequencer circuit 23.

In FIG. 4, during the third clock period, a drop occurs in the level of signal RC, to a value less than 8 volts, after the 8 volt level already described. As will be better understood hereafter, this drop in level corresponds to the transmission of a bit of value 1 from key 2 towards the exchange device and it corresponds to a level 1 pulse of the binary signal IN.

Consequently, the signal PR at the output of the sudden variation detection circuit 29 represents the restoration of signal P representative of the data transmitted by the exchange device 1, since the signal PR passes from 0 to 1 for the sudden decreases in signal RC and from 1 to 0 for the sudden increases of this signal. The transitions relative to the drop related to the transmission of a bit of value 1 by key 2 being ignored, because of signal IN.

The sequencer circuit 23 generates, from the clipped signal ECR, from pulse Z and from the signal PR:

- the signal AU, at level 1 for allowing the exchanges after establishment of the different voltages,
- the signal H2, a clock signal of period T2=64 T1, here at level 0 for the first half period,
- the signal IN comprising a pulse at level 1 for the clock periods only during which a bit of value 0 has been transmitted by the exchange device, which pulse, in this case, passes to level 1 after a time substantially equal to 16 times T1, from the beginning of a clock period, and remains there for a time substantially equal to 28 times T1. Thus, the fronts of the pulse of signal IN both occur while signal P is constant, here at low level.

The processing circuit 25 is therefore able, particularly from the restored signal PR and the clock signal H2, to know the value of each of the bits transmitted by the exchange device 1, while determining the level of the restored signal PR at the time of the rising transition of the clock signal H2.

In response to the information thus received, representing for example an address of a memory included in circuit 25, the latter generates the signal DE representative of a succession of bits to be transmitted to the exchange device 1 and which represents, for example, the contents of the pocket previously addressed. Naturally, in such a real situation, circuit 25 would wait to receive all the bits specifying the address of the memory pocket before transmission. However, here, for clarity of he description and also because one of the advantages of the system of the invention is the possibility of transmitting, during the transmission time of a bit to key 2, a bit to the transfer device 1, it is assumed that the processing circuit 25 is immediately ready to transmit.

As shown in the lower part of FIG. 4, the bits to be transmitted by the processing circuit 25 are for example 0, 1 and 0. It will be noted that, during the second clock period, which corresponds here to the reception, from the exchange device 1, of a bit of value 1, the transmission of a bit by the processing circuit 25 is forbidden. Such a characteristic is not obligatory but it has the advantage that the transmission of a bit by key 2 takes place obligatorily during a clock period when it is certain that the signal RC is at the high level for the last threequarters of this clock period. This makes it possible to have a relatively long time for varying, if required and because of signal D, the load which the assembly of electronic circuits of the key represents for the amplifier 16 and coil 17, so as to transmit to the exchange device 1 the information from the processing circuit 25.

For this, the output signal D from AND circuit 30 is always at level 1, except when the signal IN and the signal DE are simultaneously at level 1. The load variation and limitation circuit 26 is adapted, as will be understood hereafter, to consume an appreciable current, when signal D passes to level 0 and so thus cause a sudden variation of the load seen by the exchange device 2, which causes a sudden current increase which is detected by the detector circuit 18.

Thus, when a bit of value 0 has been transmitted by the exchange device 1, the transmission of a bit by key 2 is authorized, and the sudden load variation during the time interval when signal P is at the low level is interpreted by the processing circuit 1 of the exchange device 1 as a bit of value 1 coming from key 2, whereas the absence of a sudden load variation during this same time interval is interpreted as a bit of value 0 coming from this key 2.

Referring to FIG. 3, the operation of the load variation and limitation circuit 26 will now be described. Transistor 265 is mounted in a way known per se for compensating for the influence of the temperature. When signal D is at level 0, transistor 266 is disabled, resistor 264 is in the air, and the base potential of transistor 261 is pulled upwards by the resistor, 263. Transistor 261 is therefore highly conducting and the potential of its collector is very low. The result is that the Zener diode 262 conducts and consumes an appreciable current, which therefore corresponds to a high load for the rectifier circuit 28 and, accordingly, the load equivalent to coil 27 followed by the electronic circuits of key 2 is increased- In practice, the potential RC is forced to a value close to the Zener voltage of 6.2 volts, nevertheless compatible with the operation of regulator 21.

When signal D is at level 1, transistor 266 is highly conducting and transistor 261 is biased by the resistor bridge 263, 264 so that its potential VCE is about 4 volts. Thus, circuit 26 may play the role of limiter for, when the potential of signal RC tends to exceed 10 volts, the Zener diode 262 begins to conduct. This results in stabilizing the load represented by key 2 and, in addition, makes possible the use in the key of electronic components of HC MOS type, whose supply voltage must in no case exceed 10 volts.

When the identification procedure is relatively complex, the processing circuit 25 may in particular comprise a microprocessor which may then provide, wholly or partially, the functions provided by sequencer 23.

In this case, the processing circuit 25 may also comprise an oscillator, fed by the signal AC, for delivering to the microprocessor the high frequency clock signal required for its operation. This clock signal, relative to the internal operation of the microprocessor, does not need to be synchronous with the signal ECR, without that being in contradiction with the statement made according to which the signal ECR is used as a gating signal. In fact, the signal ECR is always used as gating signal, particularly in that it allows the clock signal H2 to be obtained for example whose rising transitions define the times when it is certain that the restored signal PR is representative of the bits coming from the exchange device 2 of the lock. This does not then concern the internal operation of the microprocessor and the signal delivered by the oscillator.

By way of example, FIG. 5*a* shows a flat key having a recess 3 which passes therethrough, inside which is disposed a module 2a integrating the electronic circuits of FIG. 2 and coil 27, module 2a is protected by two epoxy resin layers 4.

Similarly, FIG. 5*b* shows a cylindrical key, to the end of which is screwed or bonded a module 2b integrating the electronic circuits of FIG. 2, and coil 27, for example a cylindrical coil having the same axis as the key, disposed at the end of module 2b.

Naturally, the scope of the present invention is not limited to the description which has just been made and it is within the scope of a man skilled in the art for example to replace the transmission by coupled coils by a transmission by contacts, or else avoid inhibiting the key from transmitting when a bit of value 1 has been transmitted by the exchange device, by using differently the time available in each clock period. Similarly, it is within the scope of a man skilled in the art to replace the above described circuits, comprising particularly bipolar transistors, by corresponding circuits formed using CMOS technology for example.

Similarly, although it is particularly simple and advantageous to use pulse width modulation, followed by amplitude modulation, for transmitting the information from the exchange device to the key, this is not obligatory and other types of modulation of the carrier can also be used.

Finally, although the system of the invention is particularly useful for the application which has been described in the locksmith field, it is obviously possible to apply it to any other field such as memory cards, for example.

In the field of memory cards, and particularly in that of bank cards, the complexity of the identification procedure generally requires the use of a microprocessor associated with the clock oscillator already discussed. Naturally, if the device is provided for receiving several types of microprocessor, the oscillator may be programmable.

What is claimed is:

1. A system for exchanging information between at least one portable object and at least one sedentary exchange device, wherein:

said sedentary exchange device comprises:

(a) first processing means for generating a first signal representative of a first succession of binary elements or bits to be transmitted to said portable object, (b) means coupled to said first processing means for modulating a carrier wave in response to said first signal, (c) transmission means coupled to said modulating means for transmitting said modulated carrier wave to said portable object, and (d) first detector means coupled to said transmission means for detecting sudden variations of amplitude of the current in said transmission means and for delivering a detected signal to said first processing means, and said portable object has a variable impedance and comprises:

(a) transmitting and receiving means for receiving said modulated carrier wave, (b) means for restoring said first signal in response to said modulated carrier wave, (c) second processing means coupled to said restoring means for receiving said first restored signal and for generating a second signal representative of a second succession of bits, and (d) means coupled to said second processing means for suddenly varying said impedance in response to said second signal, wherein during transmission of a bit of said first succession, a bit of said second succession is transmitted and detected by said first detector means.

2. The system of claim 1, wherein said modulation means modulates the amplitude of said carrier wave and said restoration means comprises second detector means for detecting the sudden variations of amplitude of said modulated carrier wave.

3. The system of claim 1, wherein said first signal is a binary signal comprising a first succession of pulses, the width of each pulse in said first succession having a value representative of the amplitude of a corresponding one of said binary elements and said second signal is a binary signal comprising a second succession of pulses, each of said second succession only being generated when a bit of said first succession has a given value, and the fronts of each of the pulses in said second succession only occurring while the amplitude of said first signal is constant.

4. The system of claim 1, wherein said means for suddenly varying the impedance of said portable object is adapted to limit the amplitude of said modulated carrier.

5. The system of claim 1, wherein said portable object further comprises means coupled to said receiving means for clipping said modulated carrier, wherein said second processing means is synchronized by said clipped modulated carrier wave.

6. The system of claim 1, wherein said receiving means comprises means for rectifying said carrier wave and regulation means for delivering, in response to said rectified carrier wave, an electric energy supply voltage to the components of said portable object.

7. The system of claim 1, wherein said transmission means comprises a first coil, said restoration means comprises a second coil, and the coupling between said portable object and said sedentary exchange device is magnetic coupling, obtained by drawing together said first and second coils without contact.

8. The system of claim 1, wherein said portable object is a key and said sedentary exchange device is installed in a lock, whereby said lock may not be unlocked unless said second succession of bits indicates that said key is authorized to do so.

9. A portable object for exchanging information with at least one sedentary exchange device transmitting a modulated carrier, said portable object having a variable impedance, comprising:

(a) transmitting and receiving means for receiving and demodulating said modulated carrier, (b) processing means coupled to said transmitting and receiving means for generating a signal representative of a succession of bits to be transmitted to said exchange device, and (c) means for suddenly varying said impedance in response to said signal, wherein said signal may be transmitted to said sedentary exchange device simultaneously with the transmission of said modulated carrier to said portable object.

* * * * *